United States Patent
Mueller et al.

(10) Patent No.: US 6,424,406 B1
(45) Date of Patent: Jul. 23, 2002

(54) OPTICAL DIFFUSER PLATES

(75) Inventors: Michael Mueller, Bensheim; Volker Benz, Hoechst; Michael Meier-Kaiser, Alsbach-Haemlein; Hans Lorenz; Volker Mende, both of Darmstadt; Helmut Haring, Reinheim; Berthold Schoenig, Rossdorf, all of (DE)

(73) Assignee: Roehm GmbH & Co. KG, Darmstadt (DE)

(*) Notice: Subject to any disclaimer, the term of this patent is extended or adjusted under 35 U.S.C. 154(b) by 0 days.

(21) Appl. No.: 09/284,470

(22) PCT Filed: Sep. 25, 1997

(86) PCT No.: PCT/EP97/05261
§ 371 (c)(1),
(2), (4) Date: Jul. 7, 1999

(87) PCT Pub. No.: WO98/17889
PCT Pub. Date: Apr. 30, 1998

(30) Foreign Application Priority Data

Oct. 21, 1996 (DE) .......................... 196 43 118
Jul. 3, 1997 (DE) .......................... 197 28 391

(51) Int. Cl.⁷ .......................... G02B 27/00; G02B 5/02
(52) U.S. Cl. .......................... 355/613; 359/599; 359/614
(58) Field of Search .......................... 359/599, 613, 359/614; 428/220, 212, 292, 294, 364, 375, 392; 264/162, 171, 172.14, 172.15

(56) References Cited

U.S. PATENT DOCUMENTS

| | | | | |
|---|---|---|---|---|
| 2,749,794 A | * | 6/1956 | O'Leary | 359/599 |
| 3,402,981 A | * | 9/1968 | Cardone | 359/614 |
| 3,444,031 A | * | 5/1969 | Schrenk | 359/599 |
| 3,940,896 A | * | 3/1976 | Steel | 359/613 |
| 4,989,952 A | * | 2/1991 | Edmonds | 359/600 |
| 5,142,415 A | * | 8/1992 | Koehnle | 359/614 |
| 6,280,671 B1 | * | 8/2001 | Benz et al. | 264/172.14 |

OTHER PUBLICATIONS

English abstract of the Japanese reference No. 63–319410 issued to Tawara Kazutoki, Dec. 1988.*

* cited by examiner

Primary Examiner—Thong Nguyen
(74) Attorney, Agent, or Firm—Oblon, Spivak, McClelland, Maier & Neustadt, P.C.

(57) ABSTRACT

The invention relates to optical diffuser plates (1) made of transparent plastics such as polycarbonate or polymethacrylate. Several thin strips (2) made of plastic B inserted into plates made of transparent plastic A with the proviso that A and B are incompatible and the strips (2) made of plastic B are subsequently withdrawn. The hollows that are formed in the plate (1) made of plastic A are used to deflect light.

16 Claims, 3 Drawing Sheets

OPTICAL DIFFUSER PLATES

BACKGROUND OF THE PRESENT INVENTION

1. Field of the Invention

The invention relates to optical diffuser plates of transparent plastic designed for improved illumination of rooms by means of daylight.

2. Description of the Related Art

One of the most important objects of the art is to save energy or to preserve existing resources. The studies in this regard have been directed not only at economizing on fossil energy sources but also on reducing the consumption of electrical power.

One problem in illumination of relatively deep rooms with daylight is that the rear zone of the rooms remote from the window is not adequately illuminated (see FIG. 1), especially when the sun is high. Consequently, parts of the room must be artificially illuminated even during the daytime, which is a disadvantage from the viewpoint of both energy and ergonomics. FIG. 1 represents a typical inside room. The reference symbols used therein have the following meanings:

| S | = Incident sunlight | H | = Relatively bright zone |
| F | = Window | D | = Relatively dark zone |
| T | = Door | | |

SUMMARY OF THE PRESENT INVENTION

The object of the present invention is now to remedy this situation. So-called optical diffuser plates are used to solve the problem. These optical diffuser elements—via part of the window area—collect the daylight and deflect it into the depth of the room or toward the ceiling (FIG. 2). The optical diffuser elements thus redirect daylight streaming in from outside at a steep angle into the inside of the room.

To achieve the desired deflection effect, there is proposed an optical diffuser plate LLP with the following structure (FIG. 3):

DETAILED DESCRIPTION OF THE DRAWINGS

In a plate—usually plane—of transparent plastic A with refractive index $n_A$ there are embedded thin strips of a plastic B with refractive index $n_B$, preferably by coextrusion, with the proviso that plastic A is not compatible with plastic B and that plastic A separates from plastic B. This separation is favored by the existence of a yield point in plastic B.

The following plastics are examples of plastic B:

fluoropolymers such as thermoplastic fluoropolymers, an example being THV 500 G of the 3M Company, polypropylene types such as the Lupolen types of BASF AG, polyethylene types, such as the polyamide types, examples being the Vestamid types of Hüls AG.

The optical diffusion effect can be achieved by two inherently different features. Accordingly, the surface of separation of the materials or the material transition either is noticeable only by virtue of the difference in refractive indices or—if a separating gap is present—is very clearly evident as a reflecting surface.

The coextruded strips of plastic B become detached from plastic A during or after cooling of the plate and can be easily pulled out of this plate. This can be done manually or by a winding mechanism.

The strips of plastic B can be disposed both perpendicular to the plate surface and at an angle of y<90° to the plate surface.

When a light beam is incident on an optical diffuser plate LLP of the described type, the laws of total internal reflection apply at the interface between plastic A and the air gap. The critical angle $a_G$ of total internal reflection depends only on the refractive indices of the two plastics.

$$a_G = \arcsin n_A/n_B$$

For the case that plastic B has detached from plastic A and thus that a gap is present between the strips and the matrix surrounding them, the said angle is given by:

$$a_G = \arcsin n_A/1$$

Figure 4:
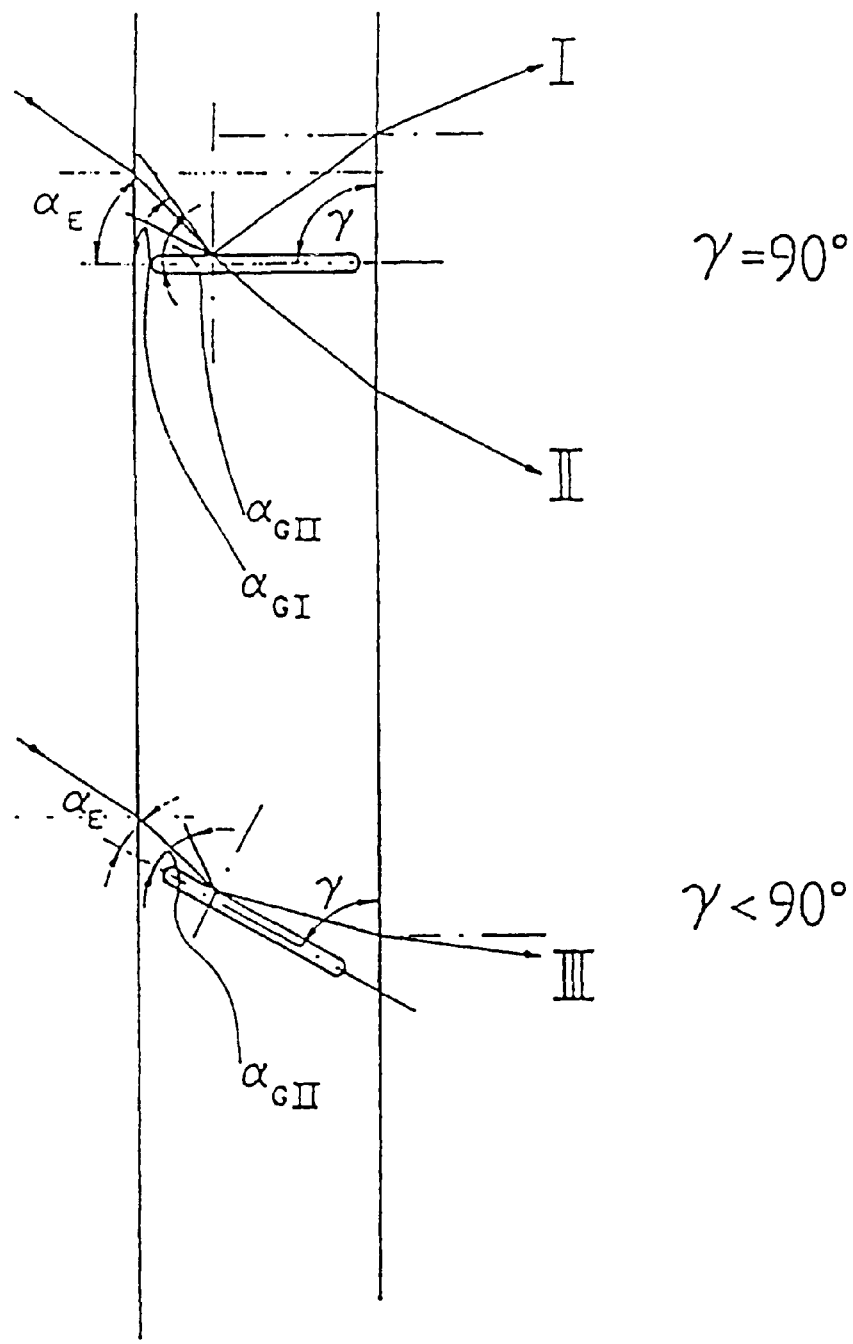
FIG. 4 represents different orientations of the steps.

If the angle of incidence $a_E$ of the light beam on the interface is smaller than the critical angle $a_G^I$, total internal reflection takes place (Case I in FIG. 4). The steeply incident light beam is deflected to a shallower trajectory or upward. The maximum possible difference in refractive index is achieved by replacing, by air, the plastic strips of plastic B described in German Patent Application DE 195 43 687.3 having a refractive index different from that of plastic A.

If the angle $a_E$ is larger than $a_G^{II}$ (Case II in FIG. 4), the incident light beam passes through the interface. Since the preferred method of manufacture of the optical diffuser plates LLP is coextrusion of the plate together with embedded thin strips, the most desirable starting materials are coextrudable, transparent thermoplastics which are incompatible with the plastic A of the plate. The critical angle $a_G$ and thus the effectiveness of the system increase as the difference in refractive index becomes larger. Adequate effectiveness of the system even at small critical angles $a_G$ can be achieved by orienting the strips of plastic obliquely (V<90°). The angle of incidence $a_E$ on the interface is reduced by the oblique orientation of the strips (Case II in FIG. 4).

Examples of suitable plastics A are polymethyl methacrylate (PMMA and copolymers) or polycarbonate (PC) and of plastic B are the polymers mentioned hereinabove. In experiments on the manufacture of optical diffuser plates as described hereinabove, it 0has been shown that yet another feature leads to unexpected optical diffusion effects. It has been found that, if plastic B is incompatible with plastic A, in which case the thin strip of plastic B does not adhere at all to the matrix, or in other words to plastic A, and is separated therefrom by a thin gap, the optical diffusion effect is increased. The detachment of the plastic strip of plastic B from matrix polymer A can be easily recognized optically. The plastic strip appears to have a reflecting surface. This is a sign that the thin gap along the surface of the strip has caused pronounced total internal reflection. The refractive indices of air and the matrix plastic differ to an even greater extent that those of plastic B and matrix plastic A, in conformity with the formula presented hereinabove, thus explaining the total internal reflection.

Heretofore it has not yet been possible to establish whether the gap is initially filled with air or is more or less free of air. It can be assumed that the gap will eventually become filled with air by subsequent diffusion of air through plastic A, once plastic B has detached from plastic A.

Detachment of the two plastics A and B from each other is favored by different coefficients of thermal expansion. It is achieved by cooling the extrusion compound. Under these conditions the strip should preferably shrink to a greater extent than the matrix, or in other words plastic B should have a higher coefficient of thermal expansion than plastic A. Even small differences of ≧0.001% in the coefficients of thermal expansion lead to the effect according to the invention.

If a separating gap is formed between plastics A and B, it is immaterial whether the two plastics still have different refractive indices within the meaning described initially. The refractive index of plastic A can preferably be higher than that of plastic B, but may also be the same or lower. The total internal reflection resulting from formation of the separation point is always sufficient to produce an impressive optical diffusion effect. The width of the separating gap must be larger than 1 μm. The thickness of the optical diffuser plates LLP is generally in the range of 2 to 20 mm. The embedded, preferably coextruded strips of plastic B usually have a thickness of 0.05 to 0.5 mm and a width of 50 to 95% relative to the thickness of the plate comprising A. In general, the strips of plastic B are disposed regularly at mutual spacings of 2 to 40 mm in plastic plates A. The other dimensions of optical diffuser plates LLP are expediently adapted to glazing units, especially to window or door sizes. Restriction of the dimensions due to the extrusion technology employed is not expected as a rule.

The manufacturing technology involving extrusion in an extrusion machine through multi-component nozzles corresponds to the prior art (West German Application A 4326232).

Figure 1:
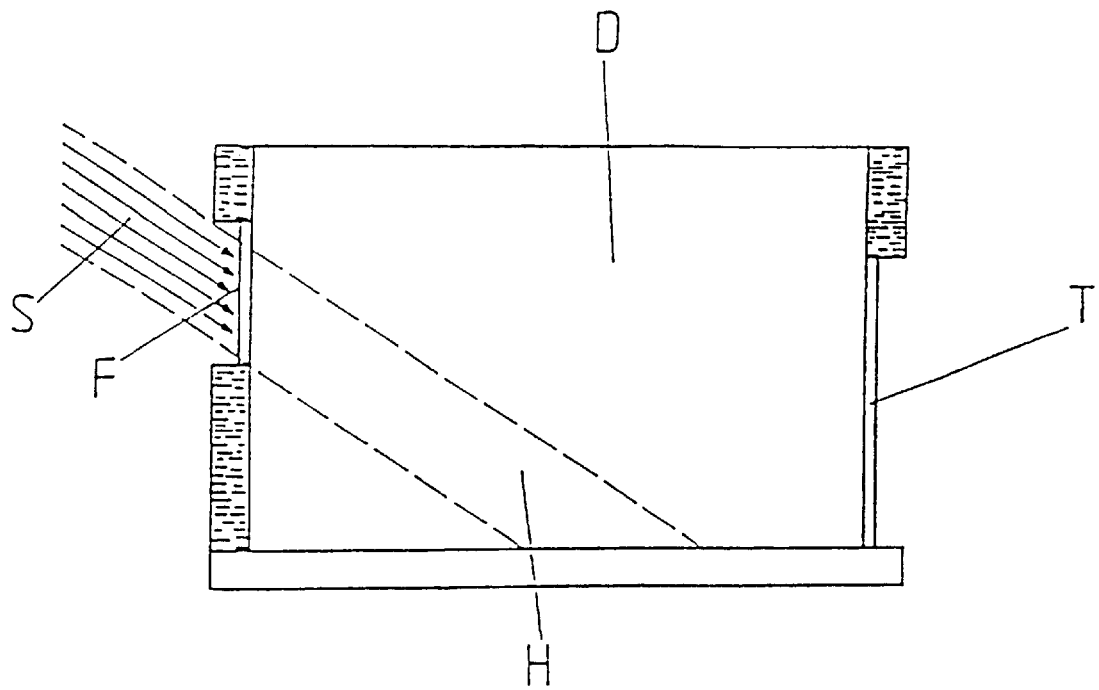
FIG. 1 represents a typical inside room with daylight.
Figure 2:
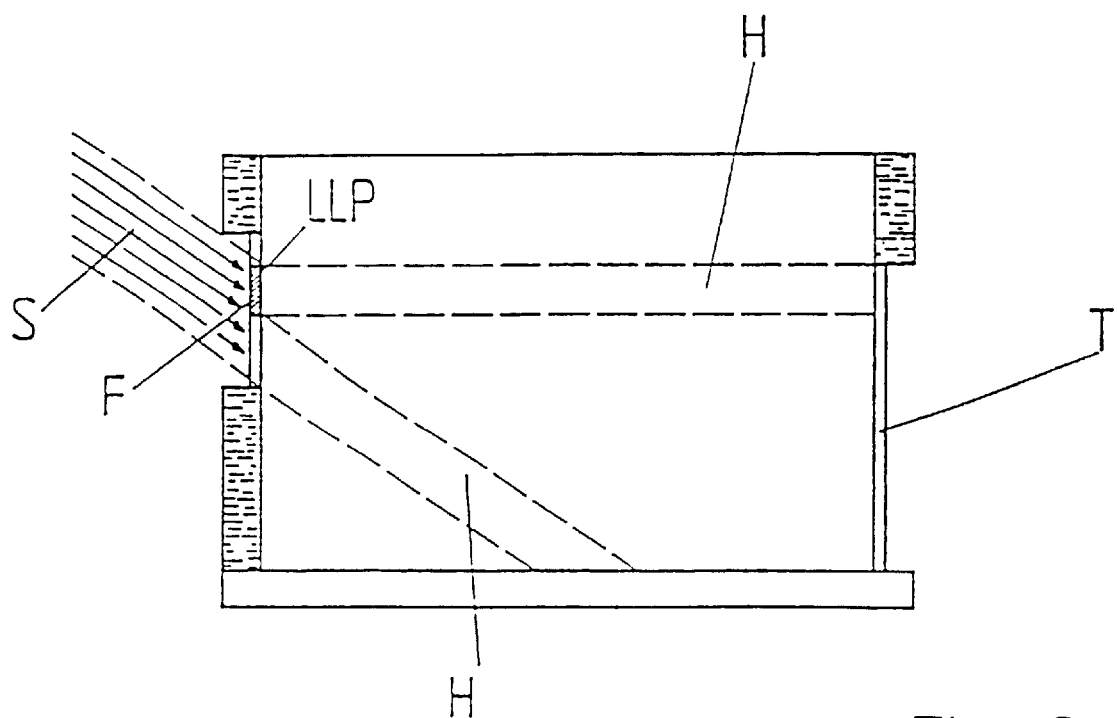
FIG. 2 represents the room depicted in FIG. 1, now equipped with the optical diffuser element according to the invention in part of the window area. The reference letters LLP denote the optical diffuser plate. The other reference letters correspond to those in FIG. 1.
Figure 3:
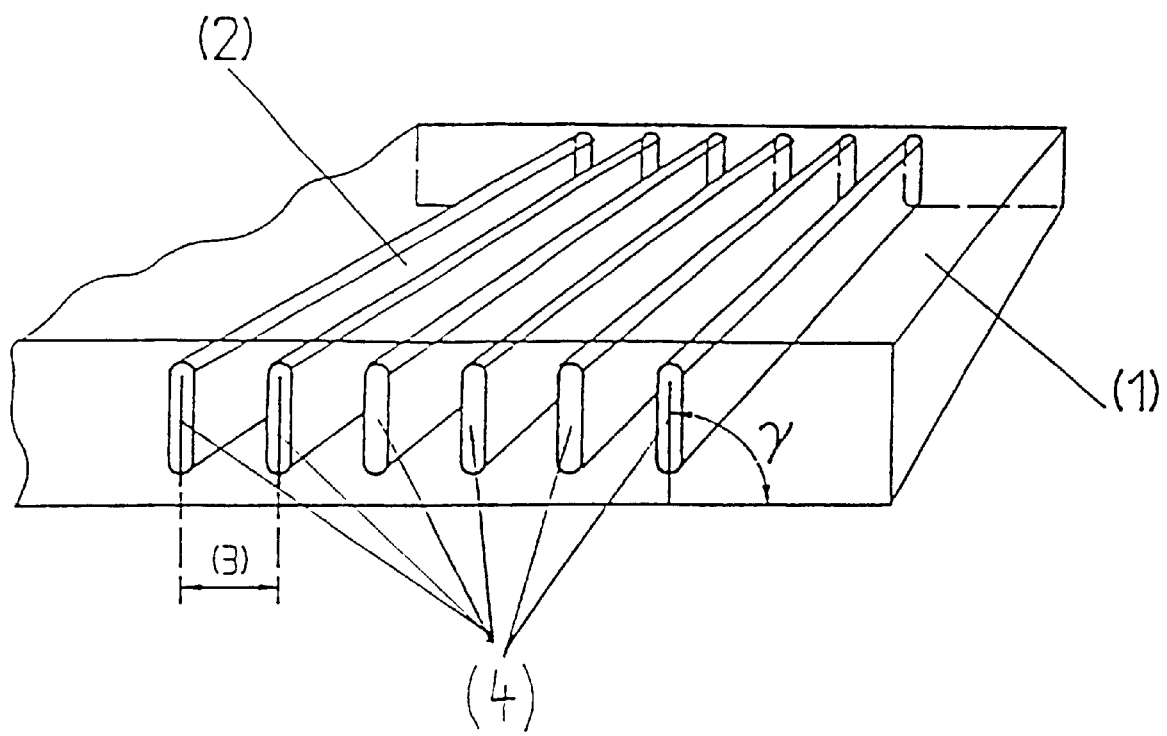
FIG. 3 represents an optical diffuser plate.

The optical diffuser plates LLP according to the invention will be explained with reference to FIG. 3, wherein the reference symbols have the following meanings:

| (1) | = | optical diffuser plate LLP of plastic A |
| (2) | = | embedded thin strips of plastic B |
| (3) | = | distance between the hollows formed by extraction of the plastics |
| (4) | = | hollows |

The optical diffuser plates according to the invention can be mounted in known mounting frames for plates of organic glasses.

Advantageous Effects

The optical diffuser plates according to the invention can be used successfully for improved illumination of rooms, including workshops, parlors, basements, vaults, shafts, and possibly even vehicles such as ships, etc. The use thereof can contribute not only to energy savings but also to improved ergonometric layout of work rooms.

What is claimed is:

1. An optical diffuser plate comprising:

a plate of transparent plastic having an incident surface which can receive an incident light beam; and a plurality of hollows in the plate, wherein said hollows do not reach said incident surface.

2. The optical diffuser plate of claim 1, wherein the hollows are planar hollows disposed perpendicular to the plane of said plate.

3. The optical diffuser plate of claim 1, wherein the hollows are planar hollows disposed at an angle γ to the plane of said plate, wherein 0°<γ<90°.

4. The optical diffuser plate of claim 1, wherein the plastic of said plate is a thermoplastic.

5. The optical diffuser plate of claim 1, wherein the plate has a thickness of 2 to 30 mm.

6. An optical diffuser plate comprising:

a plate of transparent plastic having an incident surface which can receive an incident light beam; and a plurality of hollows in the plate, wherein the hollows have a thickness of 0.05 to 0.5 mm.

7. A process for manufacturing an optical diffusion plate, comprising the steps of:

coexruding a plastic sheet having therein a plurality of plastic strips which separate from the plastic sheet upon cooling;

permitting the coexruded sheet and strips to cool and separate.

8. The process of claim 7 including the step of removing the cooled strips from the sheet to form hollows in the sheet.

9. The process of claim 8, wherein the plastic sheet and the plastic strips have different coefficients of thermal expansion.

10. The process of claim 8, wherein the plastic sheet and the plastic strips have different indexes of refraction.

11. The process of claim 8, wherein the plastic sheet is formed from a material taken from the group consisting of polymethacrylate and polycarbonate.

12. The process of claim 8, wherein the strips are formed from a material taken from the group consisting of a thermoplastic fluoropolymer, a polypropylene, a polyethylene and a polyamide.

13. The process of claim 7, wherein the plastic sheet and the plastic strips have different coefficients of thermal expansion.

14. The process of claim 7, wherein the plastic sheet and the plastic strips have different indexes of refraction.

15. The process of claim 7, wherein the plastic sheet is formed from a material taken from the group consisting of polymethacrylate and polycarbonate.

16. The process of claim 7, wherein the strips are formed from a material taken from the group consisting of a thermoplastic fluoropolymer, a polypropylene, a polyethylene and a polyamide.

* * * * *

UNITED STATES PATENT AND TRADEMARK OFFICE
CERTIFICATE OF CORRECTION

PATENT NO.     : 6,424,406 B1
DATED          : July 23, 2002
INVENTOR(S)    : Mueller et al.

It is certified that error appears in the above-identified patent and that said Letters Patent is hereby corrected as shown below:

<u>Title page,</u>
Item [75], should read:

-- [75]  Inventors:  Michael Muller, Bensheim; Volker Benz, Hoechst; Michael Meier-Kaiser, Alsbach-Haehnlein; Hans Lorenz; Volker Mende, both of Darmstadt; Helmut Haering, Reinheim; Berthold Schoenig, Rossdorf, all of (DE) --

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,424,406 B1
DATED : July 23, 2002
INVENTOR(S) : Mueller et al.

It is certified that error appears in the above-identified patent and that said Letters Patent is hereby corrected as shown below:

<u>Title page,</u>
Item [75], should read:

-- [75] Inventors: Michael Mueller, Bensheim; Volker Benz, Hoechst; Michael Meier-Kaiser, Alsbach-Haehnlein; Hans Lorenz; Volker Mende, both of Darmstadt; Helmut Haering, Reinheim; Berthold Schoenig, Rossdorf, all of (DE) --

This certificate supersedes Certificate of Correction issued January 14, 2003.

Signed and Sealed this

First Day of April, 2003

JAMES E. ROGAN
*Director of the United States Patent and Trademark Office*